July 21, 1970 J. R. PARKS ET AL 3,521,236

ELECTRO-OPTICAL APPARATUS FOR RECOGNIZING PRINTED OR WRITTEN CHARACTERS

Filed April 12, 1965 3 Sheets-Sheet 1

INVENTORS
John Ronald Parks
Charles Howard Daws
BY
Cushman, Darby & Cushman
ATTORNEYS INVENTORS
John Ronald Parks
Charles Howard Davis
BY
Cushman, Darby & Cushman
ATTORNEYS INVENTORS
John Ronald Parks
Charles Howard Davis
BY
Cushman, Darby & Cushman
ATTORNEYS United States Patent Office 3,521,236

Patented July 21, 1970

3,521,236

ELECTRO-OPTICAL APPARATUS FOR RECOGNIZING PRINTED OR WRITTEN CHARACTERS

John R. Parks and Charles H. Davis, Teddington, England, assignors to National Research Development Corporation, a corporation of Great Britain Filed Apr. 12, 1965, Ser. No. 447,180
Claims priority, application Great Britain, Apr. 13, 1964, 15,196/64
Int. Cl. G06k 9/06, 9/12
U.S. Cl. 340—146.3 4 Claims

ABSTRACT OF THE DISCLOSURE

Character recognition system in which the character area is scanned by a light spot moving along a raster scan path to develop, by photoelectric sensing and logarithmic amplifier means, an analogue-form electric signal representing on a logarithmic scale the differing optical characteristics of the character area along such scan path, in which different portions of said developed signal are brought into time coincidence by means of synchronous switching means or fixed value signal delay lines to form a plurality of separate analogue-form signals which represent respectively the logarithmic scale values of the optical characteristics of the character area along each of a plurality of parallel and widely spaced examination lines within such character area, said separate signals being each supplied to a separate multi-tapped delay line, in which selected groups of outputs from said delay lines, after combination in adding circuit means, are each converted by an anti-logarithmic amplifier to an auto correlation function signal, the various auto correlation function signals being then applied to amplitude sensing decision means to provide output recognition signals.

This invention relates to electronic systems and arrangements for effecting recognition of printed or written characters, such as the printed numerals provided by various accounting, office and like mechanisms, for example, a cash register, and is more particularly concerned with modifications of or improvements in systems and apparatus for this purpose as described in co-pending patent application Ser. No. 421,314 filed Dec. 28, 1964 by J. R. Parks, now Pat. No. 3,471,831.

In the system of and with the arrangements described in the aforesaid co-pending application each auto-correlation or comparison operation, of which there are at least several effective in succession in order to cover the whole of the character area, involves sequential scanning movement of a discrete and relatively small size examination area, for instance, a light spot, across the character area along several, for example, three, parallel scan or examination lines which are relatively widely separated in the direction at right angles to the scan direction. The signals obtained as a result of examination along each of such sequential line scans are then applied to a signal delay system capable of being sampled at a number of points corresponding to different value delay times and having a total delay time at least equal to the total time required to complete the series of sequential line scans of each comparison operation whereby individual signals corresponding to points along the scan lines according to a chosen orientation or pattern relationship may be brought into time coincidence for comparison with one another.

The time required to perform each auto-correlation or comparison operation as just described is thus at least equal to the time required to effect scanning of each of the spaced scan lines while, in addition, a further time period at least equal to the period of one line scan is needed to complete the signal comparison operation and to allow the delay line system to discharge before another auto-correlation or comparison operation can be commenced.

The effective time period during which signals are available for comparison is thus only $1/n+1$ of the total time required for an auto-correlation or comparison operation, where $n$ is the number of scan lines and it is one object of the present invention to increase the proportion of useful time thereby permitting an increase in operating speed and/or a reduction in the signal bandwidth due to lowering of the scanning rate.

The system according to the present invention is characterised by the movement of the examination area over a scanning path consisting of a raster-like pattern of a plurality of parallel scan lines each of which is displaced from its predecessor by a relatively small distance in a direction at right angles to the scan line direction and by the use for effecting each auto-correlation of time-separated parts of the signal waveform resulting from such scanning movement of the examination area which coincide with the passage of such examination area over a plurality of widely spaced examination lines within the area in which the character is located.

In one form of the present invention, the scanning path followed by the examination area is one consisting of a conventional regular raster of a plurality of parallel scan lines each of which is displaced, preferably by a constant and relatively small distance, from its predecessor in the same direction at right angles to the scan line direction so as to cover the character in one continuous raster-like operation, the signals obtained during such scanning being applied to each of a plurality of separate tapped signal delay devices through respective supply paths having such signal delaying characteristics that the signals present in said separate delay devices at any one time instant are those resulting from movement of the examination area along widely spaced examination lines which correspond respectively to the widely spaced scan lines of the original system.

In an alternative form of the present invention, the multiple and widely spaced examination lines, for example, those which correspond to the scan lines of the original system, are arranged to be dealt with substantially simultaneously by moving the examination area over a raster-like pattern of close-spaced parallel lines which lie at right angles to the examination line direction, the resulting interleaved line-element signals thus obtained being directed by way of commutating switch means into separate tapped signal delay devices which are thus effectively supplied in parallel and in time coincidence each with the signals due to examination of a different one of the multiple widely spaced examination lines.

In order that the invention may be better understood, examples thereof will now be described by way of illustrative example and with reference to the accompanying drawings in which.

Figure 1:
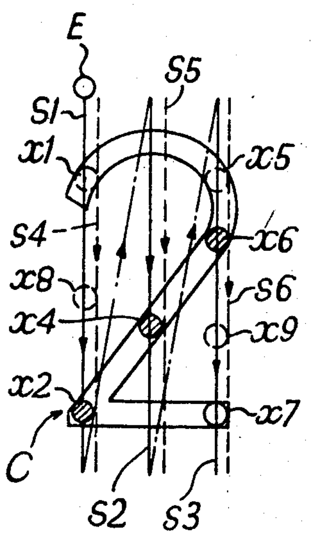
FIG. 1 is a diagram illustrating the scanning system of the aforementioned co-pending application.

Referring first to FIG. 1 which illustrates the system of the aforesaid co-pending application, the character C to be recognised, shown by way of example only as the numeral "2," is scanned by movement of the examination area E first along the rectilinear scan line *s1*, then along the scan line *s2* which is parallel to but relatively widely spaced from the line *s1* and then along the further parallel but widely spaced scan line *s3*. Such scan group of three examination lines completes the examination required for one auto-correlation or comparison operation but in order properly to cover the whole of an area in which the character may be located, hereinafter called the character area, the same basic three-line raster is repeated a number of times, each with a slight shift in a direction at right angles to the scan line direction. Thus the next scan group comprises a first line *s4* followed by a second line *s5* and a third line *s6*. The following further scan groups are similar.

Figure 2:
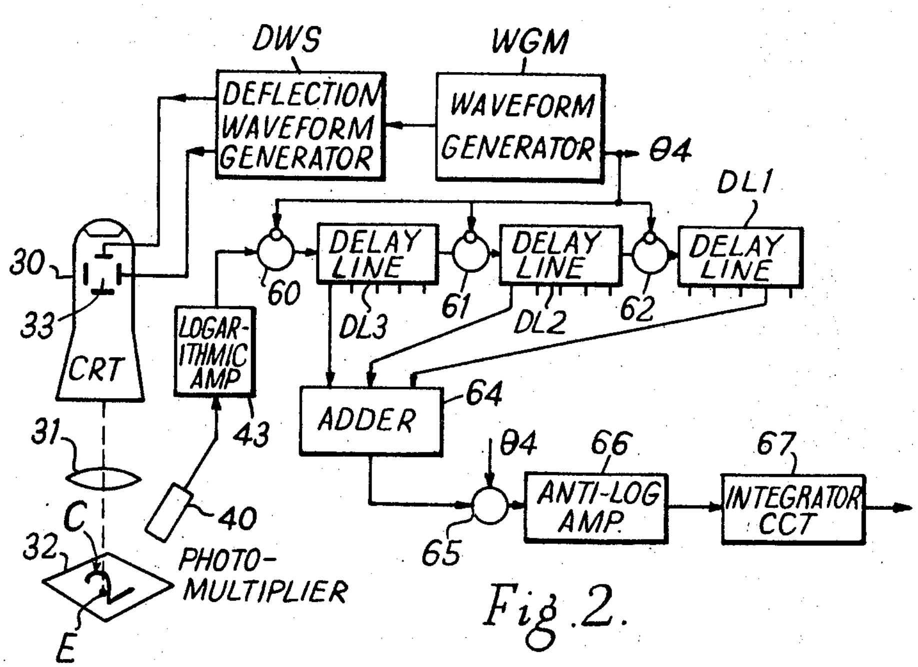
FIG. 2 is a block schematic diagram of part of the apparatus of one arrangement for operation with the scanning system of FIG. 1 and as also described in the aforementioned co-pending application.

The varying electric signals generated as a result of such scanning operations, for example and as shown in FIG. 2, by means of a photomultiplier tube shown at 40 which is subjected to light reflected from the character-bearing surface 32 which is itself illuminated by an examination area E in the form of a flying light spot tracing out the raster pattern of FIG. 1 and projected thereon by an optical system 31 from the screen of a cathode ray tube 30 whose beam is deflected to traverse the desired raster-like path by suitable current or voltage waveforms supplied to the tube deflection means 33 from a source DWS. Such source is described in detail in the aforesaid co-pending application. The signals from the photomultiplier tube 40 are fed to a logarithmic amplifier 43 thereby to derive signals whose amplitude is proportional to the logarithm of the input signal amplitude. The output signals from such amplifier 43 are then applied by way of a control gate 60 to a tapped delay line DL3, thence through another control gate 61 to another tapped delay line DL2 and finally through a further control gate 62 to a third tapped delay line DL1. Each delay line has a delay time equal to that taken to effect one line scan plus the following flyback. Signals marking the passage of the scanning light spot over the character image areas such as those indicated at *x2*, *x4* and *x6*, FIG. 1 may be brought into time coincidence by choice of appropriate tapping points on the respective delay lines DL1, DL2, DL3 for comparison in suitable means 64.

The comparison means 64 in the example shown comprise a multiple input adding circuit following by a control gate 65 the output of which is fed to an anti-logarithmic amplifier circuit 66. As described in greater detail in the aforesaid co-pending application, the arrangements effectively operate as a multiplier to produce an output signal whose amplitude is proportional to the product of the amplitudes of the signal portions of the three separate line scans which are brought into time-coincidence by virtue of the particular tapping points chosen on the respective delay lines. In some instances two or more tappings may be taken from the same delay line for application to the comparison means 64 such as, for example, to test for the presence of two or more character image parts on one line scan. This is illustrated by the areas *x1* and *x7* as well as the area *x2* in line *s1* of FIG. 1 or by the areas *x5* and *x6* in line *s3* of that figure. The specific absence of any part of a character image at any place may also be tested, for example, the gaps between the points *x2* and *x7* or between the points *x5* and *x6* in FIG. 1, by applying an inverse version of the signal derived from an appropriate tapping on the delay lines as an input to the comparison means. Thus, referring to FIG. 1, the signals corresponding to the passage of the examining light spot over the areas *x8* and *x9*, if inverted as by passage through a NOT or inverter circuit between the delay line and the comparison means 64, will be at active level and therefore assist in providing an operative level output only when the said areas are devoid of any character image part.

The control gates 60, 61 and 62 serve to control the flow of signals into the delay lines during the time of the three successive line scans of a scan group and to block any such flow and allow discharge of each line during a following, fourth, time period of line scan duration while the gate 65 is controlled to allow passage of output signals from the comparison means 64 to the anti-logarithmic amplifier 66 only during the time of the said fourth line scan period which immediately follows flyback from the third line scan. Such control is effected by the waveforms *θ4* and ΔL′, ΔF′ supplied by waveform generating means WGM which may have the form as described in detail in the aforesaid co-pending application.

It will be appreciated that a number of quite different comparison or auto-correlation operations to test for the presence or absence of different character features, such as a horizontal portion near the top or the middle or the bottom of the character, or a limb sloping downwardly from left to right or from right to left, may be effected simultaneously during each scan cycle by using further sets of comparison means 64 and anti-longarithmic amplifiers 66 with different combinations of delayed signals from the delay lines. Preferably integrator circuit means 67 are provided to form a sustained signal suitable for use in subsequent decision means which serve to identify the character being tested.

Figure 3:
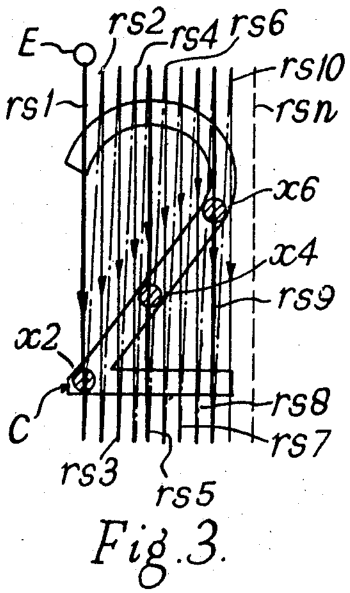
FIG. 3 is a diagram, similar to FIG. 1, illustrating one modified scanning system in accordance with the present invention.

Referring now to FIG. 3, in one embodiment of the present invention the area containing the chamacter to be recognised is scanned by a normal conventional raster of parallel lines *rs1*, *rs2*, *rs3* . . . *rsn* relatively closely and evenly spaced from one another. In such raster certain lines such as *rs1*, *rs5*, *rs9*, which have a particular spacing (in the direction at right angles to the scan direction), correspond to the examination lines, such as *s1*, *s2*, *s3* of the original scan system of FIG. 1 so that by bringing the signals generated during such spaced-apart scan lines into time coincidence, a similar auto-correlation or comparison operation may be performed with the added advantage that the equivalent of the next auto-correlation or comparison operation using lines *s4*, *s5*, *s6* of FIG. 1 may be performed immediately thereafter, i.e. without any delay, by then using lines *rs2*, *rs6* and *rs10*, FIG. 3 since such lines have the same relative spacing.

Figure 4:
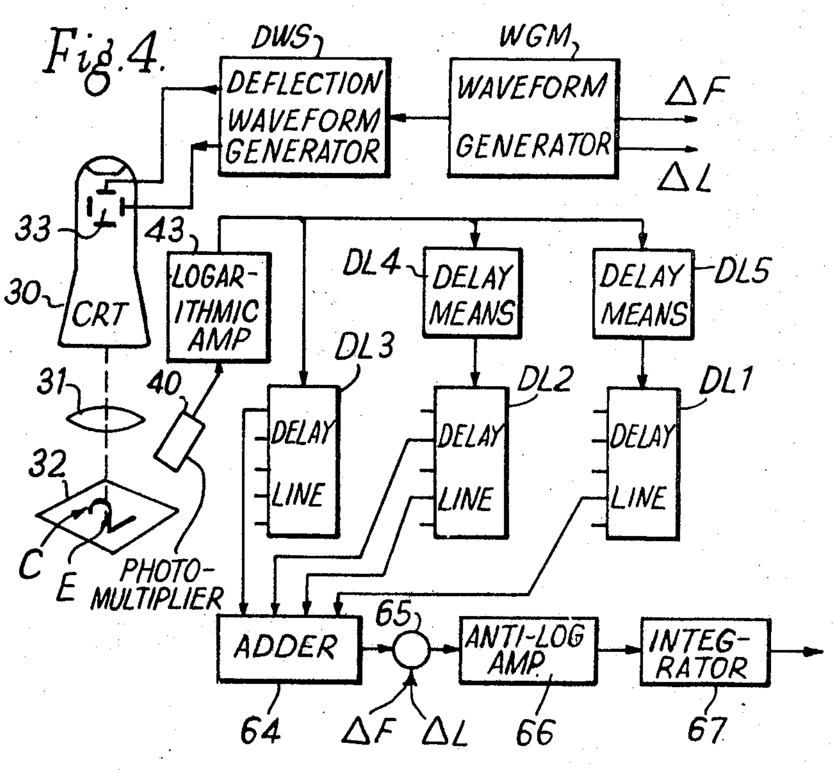
FIG. 4 is a block schematic diagram of part of one apparatus arrangement in accordance with the invention for operation with the scanning system of FIG. 3.

One apparatus arrangement for this purpose is shown in FIG. 4 in which parts equivalent to those already referred to in connection with FIG. 2 have been given similar reference characters. In this arrangement the signals from the photomultiplier tube 40 are fed as before to a logarithmic amplifier 43 and are then supplied in parallel to three separate tapped delay lines DL1, DL2 and DL3 which correspond to and may be substantially the same as those of FIG. 2 except for their total delay time which need at the most to be equal only to one line scan time instead of one line scan plus flyback time.

If the height of the character is known the delay time of each line need only be that which corresponds to the time required for the light spot to travel that distance along each line scan.

The delay line DL3 is fed directly, i.e. without any interposed delay from the amplifier 43 but the second delay line DL2 is supplied by way of means, such as an untapped delay device DL4, whose delay time is equal to the time required to scan the four scan lines *rs1* . . . *rs4* while the third delay line DL1 is likewise supplied by way of similar additional delay means, such as an untapped delay device DL5, whose delay time is equal to the time required to scan the eight scan lines *rs*1 . . . *rs*8.

With such an arrangement the respective outputs from the delay lines DL1, DL2 and DL3 of FIG. 4, after an initial delay equal to the time required to scan lines *rs*1 . . . *rs*9, will correspond to the scanning of lines *rs*1, *rs*5 and *rs*9 during the time of scanning line *rs*9, and thereafter will correspond to the scanning of lines *rs*2, *rs*6 and *rs*10 during the time of the next following scanning line *rs*10 and so on until the whole of the raster scan is completed.

The suitably selected outputs from the display lines DL1, DL2, DL3 are fed, as in the arrangment of FIG. 2, to the comparison means 64 and the output from the latter is supplied through the gate 65 to the anti-logarithmic amplifier 66. The gate 65 is arranged to be opened during a limited part of each line scan period by its controlled inhibition by waveform ΔL derived from the waveform generating means WGM. Such waveform ΔL is conveniently provided by a monostable trigger circuit triggered on at, say, the start of each line scan and reset at a suitable later instant during such scan according to its selected relaxation time in a manner analogous to the means described in FIG. 12 of the aforesaid co-pending application for generating the waveforms ΔL', ΔL''. The gate 65 may also be closed at other times during the complete raster scan in order to improve the overall signal-to-noise ratio of the further waveform ΔF which is analogous to and is generated in similar manner to the waveforms ΔF' ΔF'' of the aforesaid copending application.

With such an arrangement the number of scan lines employed in each correlation may be increased by providing further tapped delay lines with associated fixed delay devices without adding to the time required for such operation.

For the fixed value signal delay devices DL4, DL5 use is preferably made of quartz type delay lines but other known forms of delay or storage means such as a magnetic tape or drum store with spaced record and playback heads or any other form of acoustic delay line may be employed. The other circuit components may be of any suitable known form or as described in the aforesaid co-pending application.

Figure 5:
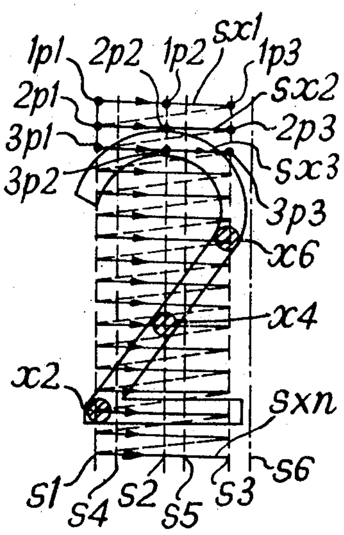
FIG. 5 is a diagram, similar to FIGS. 1 and 3, illutstrating another scanning system in accordance with the present invention.

In the alternative embodiment shown in FIG. 5 the character area is scanned along the direction of the three parallel spaced examination lines *s*1, *s*2, *s*3, corresponding to those of FIG. 1 substantially simultaneously by giving the examination area E, e.g. the light spot, a more rapid scanning movement at right angles thereto as indicated by the lines *sx*1, *sx*2, *sx*3 . . . *sxn* so that, by suitably gating-out and switching, the signals present when the scanning light spot is passing the points 1*p*1, 1*p*2, 1p3, 2*p*1, 2*p*2, 2*p*3 . . . may be directed into separate channels, one receiving the signals 1p1, 2*p*1, 3*p*1 . . ., the next the signals 1*p*2, 2*p*2, 3*p*2 . . . and the other the signals 1*p*3, 2*p*3, 3*p*3 . . . . The three separated groups of successive signals thus obtained clearly correspond to the signals obtained by the line scans *s*1, *s*2, and *s*3 of FIG. 1 except that they occur simultaneously or substantially so.

Figure 6:
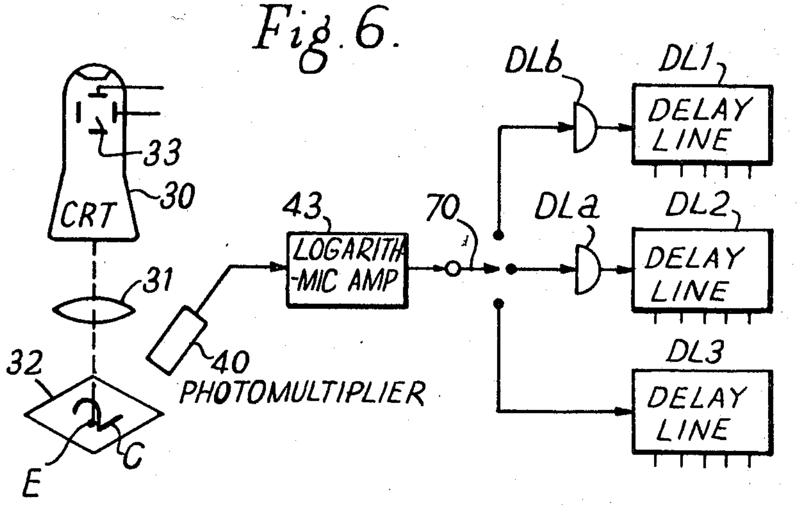
FIG. 6 is a block schematic diagram of part of one apparatus arrangement in accordance with the invention for operation with the scanning system of FIG. 5.

An apparatus arrangement for operation with this alternative scanning mode is shown in FIG. 6 where the signals from the photomultiplier tube 40 are fed to a logarithmic amplifier 43 and then directed by a commutating switch device 70, such as diode or other electronic gating circuit controlled by waveforms synchronised with the line scans *sx*1, *sx*2, . . ., into the respective tapped delay lines DL1, DL2 and DL3 which correspond with those of FIG. 4. Additional small delays DL*a* and DL*b* are preferably included to compensate respectively for the relatively small delays due to the movement of the scanning light spot from the locus of line *s*1 to that of line *s*2 and from the locus of line *s*1 to that of line *s*3. Again the equivalent of an increased number of scan lines can be obtained by increasing the number of outlets of the commutating switch device 70. After completion of one auto-correlation or comparison operation, the cycle is repeated with appropriate lateral shift of the scan line pattern to deal in like manner with the lines of the next operation corresponding to lines *s*4, *s*5 and *s*6 of FIG. 1.

Figure 7:
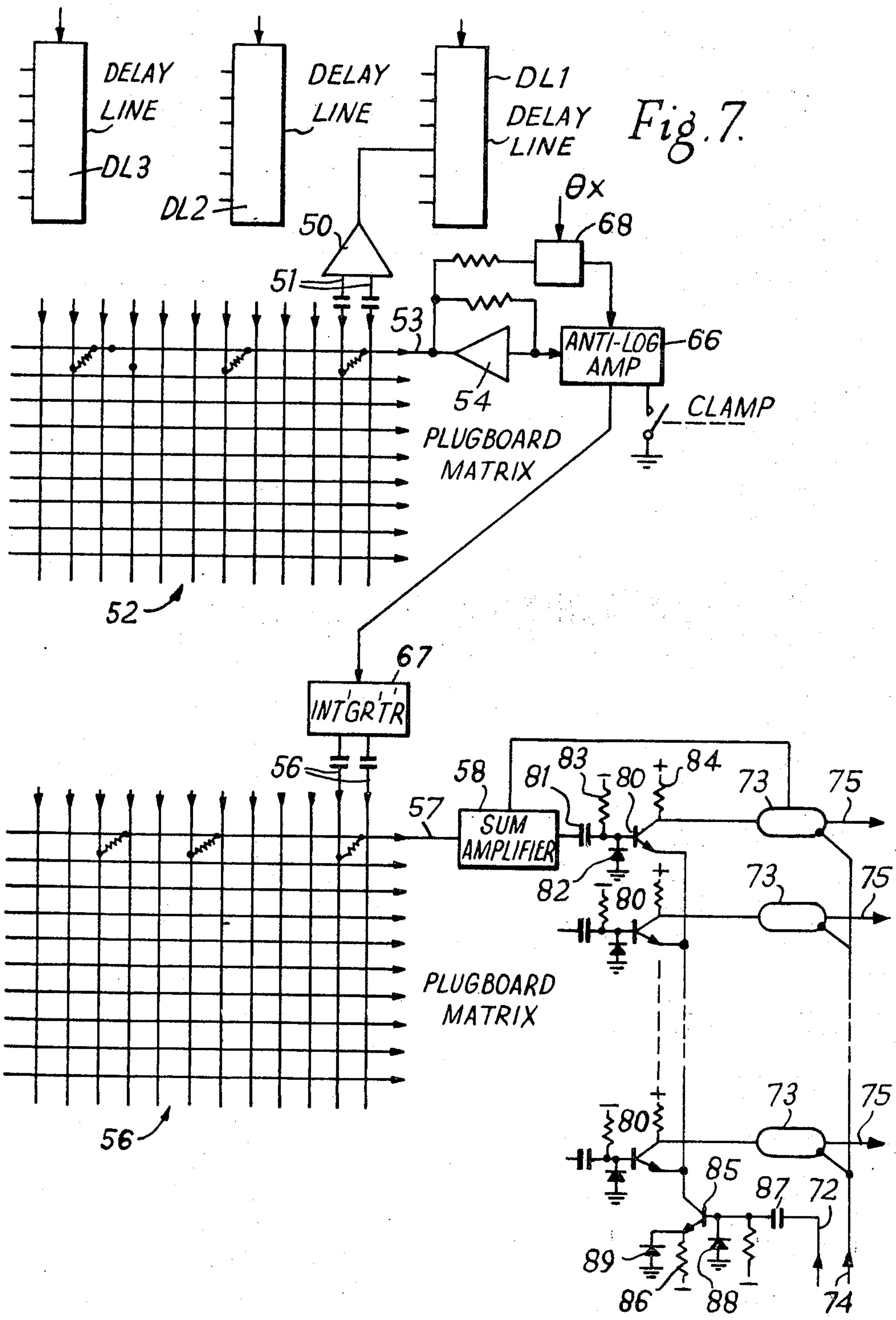
FIG. 7 is a block schematic diagram of one form of apparatus suitable for making a decision regarding the identity of an examined character.

FIG. 7 illustrates one convenient form of the apparatus arrangements for making a decision regarding the identity of the character under examination. As shown in this drawing each tapping on each of the delay lines DL1, DL2, DL3 . . . is connected to the input of an associated push-pull amplifier 50 whose respective anti-phase outputs are coupled one to each of a pair of column conductors 51 of a plugboard matrix 52 having the facility for connecting any intersecting column and row conductor by means of a resistor within the coupling plug.

The plugboard is designed to have low capacitance with push-pull inputs for each input signal and virtual earth output lines to minimize cross talk. Any desired comparison or *n*-tuple may be quickly set up by inserting coupling plugs at the requisite intersections.

Each output row conductor 53 of the plugboard is coupled through an amplifier 54 to the associated anti-logarithmic amplifier 66. The latter is provided with zeroizing arrangements 68 controlled during the intervening clamping periods in a manner similar to that already described with reference to FIG. 13 of the aforesaid co-pending application.

Each anti-log amplifier 66 is connected to supply its associated integrator circuit means 67 which may again resemble the arrangements described with reference to FIG. 14 of the aforesaid co-pending application. The circuits are A.C. coupled throughout to avoid D.C. drifting and anti-phase versions of the output from each summing or integrator circuit 67 are coupled respectively to pairs of column conductors 56 of a second and similar plugboard 55. Each row conductor 57 of the plugboard 55 is coupled to a summing amplifier 58 which includes signal controlled means for reducing its overall gain by a chosen amount of *r*%.

The amplitude selection circuit 59 comprises a group of transistors 80, one for each summing amplifier output, the latter being coupled to the base of the related transistor 80 by way of a capacitor 81. Each transistor base electrode is connected by way of diode 82 to earth and by way of resistor 83 to a negative potential source. Each transistor collector electrode is connected through an individual load resistor 84 to a positive potential source and also by way of a coupling capacitor to the input of an associated trigger circuit 73. The emitter electrodes of the transistors 80 are connected in parallel and to the collector of a further or "tail" transistor 85 whose emitter is connected to a negative potential source by way of resistor 86. The base of transistor 85 is arranged to be supplied by way of capacitor 87 with positive-going test pulses over lead 72 as described later and is also connected by way of a silicon diode 88 to a source of negative potential less than that to which resistor 86 is connected. The emitter transistor 85 is also connected to this lesser negative potential source by way of a germanium diode 89. Each of the trigger circuits 73 is supplied with suitably timed reset pulses on lead 74 and has one output coupled to the character identifying lead 75 while another available output thereof provides a gain-reducing input to the summing amplifier to reduce the gain of the latter by the said *r*%.

In the operation of this decision arrangement, the necessary cross couplings are set up on the plugboard 52 to cause each of a number of required and different character feature tests to provide an output on a different one of the row conductors 53 of the plugboard 52 and, in similar manner, further cross couplings are set up on the plugboard 55 to test for different combinations of the various character features signalled by active outputs from the different integrators 67 associated with the row conductors 53 of plugboard 52. For example, to identify the numeral "2," one of the row conductors 57 of the plugboard 55 might be cross coupled by inserted plugs with those outputs from the plugboard 52 which dealt respectively with tests for (a) the presence of a hook-shaped upper portion of the character, (b) the presence of a limb sloping downwardly from right to left, (c) the presence of a horizontal lower part and (d) the presence of a leftward facing acute-angle lower corner. The presence of all four features would then be marked by a signal output of appreciable amplitude on that row conductor 57.

The output signals present on each row conductor 57 of the plugboard 55 are tested for an amplitude above a chosen minimum by the first pulse of each pair on lead 72. If the input signal from any amplifier 58 is above the required minimum, switching on of the "tail" transistor 85 by the first of the pair of arriving test pulses over lead 72 causes the related transistor 80 to turn on with resultant generation of an output trigger pulse for operating the interconnected trigger circuit 73. The latter, when thus set on, provides a character identifying energisation of the associated output lead 75.

In order to guard against double identification, each test operation may be repeated. At the first setting as described above, the operation of any output character trigger circuit 73 causes the gain of the associated amplifier 58 to be reduced by *r*%. The output trigger circuits are then reset and the second test pulse on lead 72 is applied. If, after such second test pulse, other than one trigger circuit is again set on then a reject or "no identification" is recorded.

We claim:

1. Apparatus for effecting recognition of printed or written characters which comprises:
   - means for examining an area containing the character to be recognized by scanning movement of a spot form examination area over a raster-like pattern of rectilinear lines which are parallel and relatively closely spaced;
   - said examination area being constituted by a moving light spot derived from the screen of a cathode ray tube, the beam of which is deflected along the path of said raster of rectilinear lines;
   - signal generating means for developing an analog-form electric signal waveform representing the optical characteristics of the character area during said scanning movement of said examination area;
   - a plurality of multiple tapped elastic signal delay lines;
   - signal distribution means supplied with said developed analog-form electric signal and operative to distribute different time-separated parts thereof to said delay lines so that the signals present in each of said delay lines correspond respectively to the examined optical characteristics of the character area along each of a plurality of widely separated parallel examination lines within the character area;
   - a plurality of signal correlating means each supplied from different combinations of tappings one said delay lines to provide output auto-correlation function signals;
   - said examination lines being substantially at right angles to said raster lines and said singal distribution means including commutating switch means synchronized with said line scan movement of said examination area for directing the signals occurring at different successive instants during each of said raster-like scans into different signal channels to form said electric signal waveforms;
   - at least three widely spaced examination lines being employed and said signal delay lines being each supplied with said signal waveform in parallel; and
   - logarithmic amplifier means to which said signal waveforms are applied before application to said auto-correlation means.

2. Apparatus according to claim 1 in which said auto-correlation means comprise a multiple input adding circuit arrangement.

3. Apparatus according to claim 2 which includes decision apparatus having a plurality of amplitude discriminator circuits each connected to be supplied with different combinations of signals which are each derived from different auto-correlation means.

4. Apparatus according to claim 3 which includes at least one matrix of column and row conductors forming part of a plugboard through which selected column and row conductors can be interconnected through a resistance coupled to a connector plug insertable into any connection point at any intersection of said row and column conductors.

References Cited

UNITED STATES PATENTS

| | | | |
|---|---|---|---|
| 3,011,152 | 11/1961 | Eckdahl | 340—146.3 |
| 3,092,809 | 6/1963 | Merritt | 340—146.3 |
| 3,196,399 | 7/1965 | Kamentsky | 340—146.3 |
| 3,308,430 | 3/1967 | Clowes et al. | 340—146.3 |
| 3,158,840 | 11/1964 | Baskin | 340—172.5 |
| 3,339,179 | 8/1967 | Shelton et al. | 340—146.3 |

THOMAS A. ROBINSON, Primary Examiner

R. F. GNUSE, Assistant Examiner